(12) United States Patent
Schneider

(10) Patent No.: US 6,471,242 B2
(45) Date of Patent: Oct. 29, 2002

(54) INFLATABLE KNEE AIRBAG

(75) Inventor: David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/797,276

(22) Filed: Mar. 1, 2001

(65) Prior Publication Data

US 2002/0121770 A1 Sep. 5, 2002

(51) Int. Cl.⁷ .............................................. B60R 21/16
(52) U.S. Cl. ..................... 280/732; 280/752; 280/728.1; 280/751
(58) Field of Search ................................ 280/732, 731, 280/730.1, 739, 743.2, 743.1, 733, 728.1, 728.2, 728.3, 730.2, 751, 752, 753; 5/655.3, 644, 706, 708; B60R 21/16

(56) References Cited

U.S. PATENT DOCUMENTS

| | | | |
|---|---|---|---|
| 4,032,175 A | * 6/1977 | Aibe et al. .................... | 188/377 |
| 4,273,359 A | * 6/1981 | Scholz et al. ................ | 280/740 |
| 4,368,901 A | * 1/1983 | Kojima ......................... | 180/90 |
| 4,400,011 A | * 8/1983 | Matsuno ....................... | 180/90 |
| 4,948,168 A | * 8/1990 | Adomeit et al. .......... | 280/730.1 |
| 5,513,877 A | 5/1996 | MacBrien et al. | |
| 5,536,043 A | * 7/1996 | Lang et al. ............... | 280/728.3 |
| 5,630,621 A | * 5/1997 | Schneider ................. | 280/730.1 |
| 5,775,729 A | * 7/1998 | Schneider et al. ........ | 280/728.2 |
| 5,865,468 A | 2/1999 | Hur | |
| 5,931,493 A | * 8/1999 | Sutherland ................ | 280/730.1 |
| 5,934,733 A | 8/1999 | Manwaring | |
| 6,061,855 A | * 5/2000 | Flick ........................... | 5/655.3 |
| 6,173,990 B1 | * 1/2001 | Nakajima et al. ......... | 280/730.2 |
| 6,193,372 B1 | * 2/2001 | Okumura et al. ........... | 351/221 |
| 6,213,497 B1 | 4/2001 | Spencer et al. | |
| 6,283,508 B1 | * 9/2001 | Nouwynck et al. ......... | 280/753 |
| 6,302,437 B1 | * 10/2001 | Marriott et al. .......... | 280/728.3 |
| 6,305,710 B1 | * 10/2001 | Bosgieter et al. ......... | 280/728.1 |
| 6,318,755 B1 | * 11/2001 | Nusser et al. ................ | 280/752 |
| 6,340,170 B1 | * 1/2002 | Davis et al. .............. | 280/728.3 |

FOREIGN PATENT DOCUMENTS

| | | | | |
|---|---|---|---|---|
| DK | 003806783 A1 | * | 9/1989 | .................. 280/751 |
| JP | 403109147 A | * | 5/1991 | .................. 280/751 |

* cited by examiner

Primary Examiner—Brian L. Johnson
Assistant Examiner—Kelly E Campbell
(74) Attorney, Agent, or Firm—Sally J. Brown; James D. Erickson

(57) ABSTRACT

A knee airbag system disposed in an instrument panel accommodates one or more members extending from the instrument panel and through the system. The system includes a housing secured to the instrument panel or to a firewall of the vehicle. The housing may be configured with a housing aperture to allow the member to extend through. The system includes an inflator stored within the housing and operational in an accident situation. The system further includes an inflatable airbag stored within the housing and in communication with the inflator. The airbag has an airbag aperture in-line with the housing aperture. The airbag is sealed around the perimeter of the airbag aperture to enable inflation of the airbag. A bolster panel is secured to the airbag and includes a bolster aperture that is in-line with the housing aperture and the airbag aperture. The apertures of the housing, airbag, and bolster panel define a clearance tunnel to allow passage of a protruding member, such as a manual control or instrument that is disposed within the region occupied by the system. The clearance tunnel is sufficiently sized to allow access to the protruding member and to not obstruct inflation of the airbag.

15 Claims, 3 Drawing Sheets

INFLATABLE KNEE AIRBAG

BACKGROUND OF THE INVENTION

1. Field of the Invention

The present invention relates to airbag inflation apparatuses for use in motor vehicles and, more specifically, to an airbag system for deployment in front of the knee area of an occupant.

2. Technical Background

Inflatable airbags are well accepted in their use in motor vehicles and have been attributed with preventing numerous deaths in accidents. Some statistics estimate that frontal airbags reduce the fatalities in head-on collisions by 25% among drivers using seat belts and by more than 30% among unbelted drivers. Statistics further suggest that with a combination of seat belt and airbag, serious chest injuries in frontal collisions can be reduced by 65% and serious head injuries by up to 75%. Airbag use presents clear benefits and vehicle owners are frequently willing to pay the added expense for airbags.

A modern airbag apparatus may include an electronic control unit (ECU) and one or more airbag modules. The ECU is usually installed in the middle of an automobile, between the passenger and engine compartrnent. If the vehicle has a driver bag only, the ECU may be mounted in the steering wheel. The ECU includes a sensor which continuously monitors the acceleration and deceleration of the vehicle and sends this information to a processor which processes an algorithm to determine if the vehicle is in an accident situation.

When the processor determines that there is an accident situation, the ECU transmits an electrical current to an initiator in the airbag module. The initiator triggers operation of the inflator or gas generator which, in some embodiments, uses a combination of compressed gas and solid fuel. The inflator inflates a textile airbag to impact a passenger and prevent injury to the passenger. In some airbag apparatuses, the airbag may be fully inflated within 50 thousandths of a second and deflated within two tenths of a second.

An airbag cover covers a compartment containing the airbag module and may reside on a steering wheel, dashboard, vehicle door, or vehicle wall. The airbag cover is typically made of a rigid plastic and may be forced opened by the pressure from the deploying airbag. In deploying the airbag, it is preferable to retain the airbag cover to prevent the airbag cover from flying loose in the passenger compartment. If the airbag cover freely moves into the passenger compartment, it may injure a passenger.

Airbag apparatuses have been primarily designed for deployment in front of the torso of an occupant. More specifically, airbags are disposed for deployment between the upper torso of an occupant and the windshield and instrument panel. During a front end collision, there is a tendency for an occupant, particularly one who is not properly restrained by a seat belt, to slide forward along the seat and "submarine" under the airbag (hereinafter referenced as the "primary airbag").

In order to prevent such an occurrence, a knee airbag system has been developed to engage an occupant's knees or lower legs and prevent submarining under the primary airbag. The knee airbag system includes a knee airbag which deploys during an accident to restrain forward movement of an occupant's knees and legs. The knee airbag system may also include a fixed panel, referred to as a knee bolster panel, which is disposed in front of a knee airbag. The knee bolster panel provides a more rigid surface area than an airbag alone to better engage the knees or lower legs of an occupant to thereby restrain the occupant's lower body. Nevertheless, the knee bolster panel does provide for some degree of deformation to minimize the impact to an occupant.

Knee airbag systems are located in the lower portion of an instrument panel. This location may interfere with the disposition of certain other members such as parking brake handles, switches, vents, speakers and other manual controls or instruments. In order to accommodate panel members, the perimeter of an knee airbag system may be "trimmed" to circumvent the members. Such configuration of the system may work for members that may be disposed adjacent the exterior of the system. However, this configuration does not work well for members that are located directly within the region occupied by the knee airbag system.

In order to install a knee airbag system, the members may need to be relocated or eliminated from the region to be occupied by the system. This may prove to be extremely difficult if an automobile is to be retrofitted with the knee airbag system.

It would therefore be an advancement in the art to provide a knee airbag system which could better accommodate a member disposed in a region to be occupied by the system. It would be a further advancement in the art to provide a knee airbag system suitable for retrofitting an automobile. Such a device disclosed and claimed herein.

BRIEF SUMMARY OF THE INVENTION

The present invention is a knee airbag system that may be disposed in the lower portion of an instrument panel and allows passage of one or more members through the system. The knee airbag system may include a housing for containing components of the system and may be secured to the instrument panel or to a firewall. The housing may be configured with a housing aperture to allow a protruding member to extend through. The system includes an inflator stored within the housing and operational in an accident situation. The system further includes an inflatable airbag stored within the housing and in communication with the inflator. The airbag has an airbag aperture in-line with the housing aperture. The airbag is sealed around the perimeter of the airbag aperture to enable inflation of the airbag. A bolster panel is secured to the airbag and includes a bolster aperture that is in-line with the housing aperture and the airbag aperture.

The apertures of the housing, airbag, and bolster panel define a clearance tunnel to allow passage of a protruding member, such as a manual control or instrument that is disposed within the region occupied by the system. The clearance tunnel is sufficiently sized to allow access to the protruding member and to not obstruct inflation of the airbag. The present invention may further incorporate a plurality of clearance tunnels where multiple protruding members are required. The knee airbag system is economical to manufacture and may be configured for retrofitting existing instrument panel designs.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings only provide selected embodiments of the invention and are not therefore to be considered limiting of the scope, the invention will be described and explained with additional specificity and detail through the use of the accompanying drawings in which.

DETAILED DESCRIPTION OF THE INVENTION

A preferred embodiment of the invention is now described with reference to the FIGS. 1–4, where like reference numbers indicate identical or functionally similar elements. The members of the present invention, as generally described and illustrated in the Figures, may be implemented in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

Figure 1:
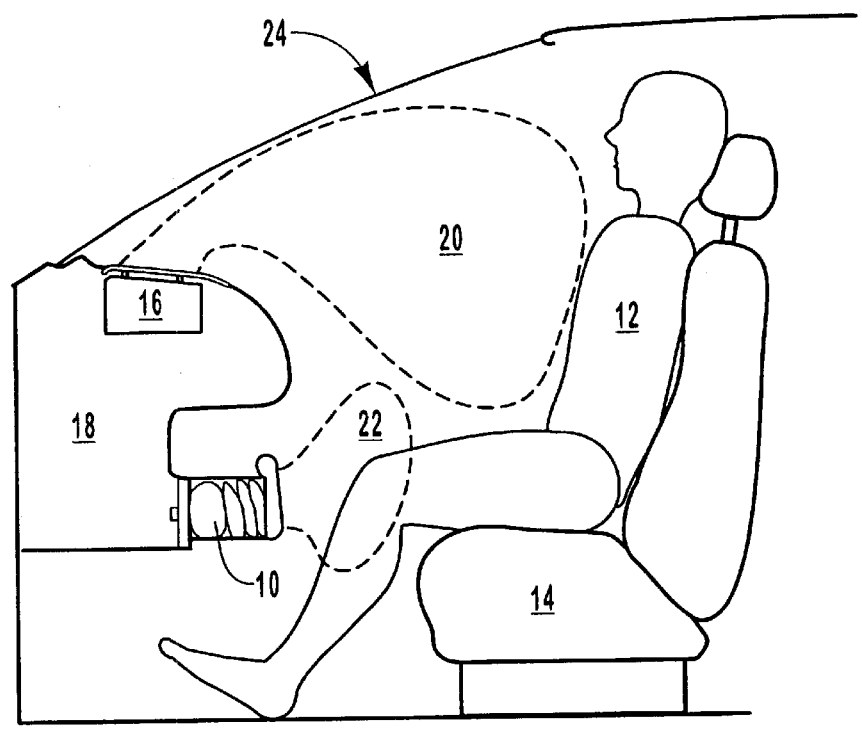
FIG. 1 is a cross sectional view of the passenger compartment of an automobile, wherein the automobile includes primary and knee airbag systems.

Referring to FIG. 1, one embodiment of a knee airbag system 10 that may be used with the present invention is shown. The knee airbag system 10 is shown relative to an occupant 12 seated in a front seat 14 in an automobile. The knee airbag system 10 may be used in combination with a primary airbag system 16 mounted in an upper portion of an instrument panel 18. The primary airbag system 16 is disposed to deploy in front of an occupant's torso. The knee airbag system 10 may be mounted to the lower portion of the instrument panel 18 in front of the occupant's knees and lower legs. One of skill in the art will appreciate that the knee airbag system 10 may be disposed in various locations, all of which are included within the scope of the invention.

Upon receipt of an activation signal transmitted from a crash sensor mounted elsewhere on the automobile, the primary airbag system 16 and the knee airbag system 10 inflate their respective airbags 20, 22 (shown in dotted lines) into the inflated positions. In the inflated position, the primary airbag 20 restrains the occupant's upper torso from being propelled forward into the windshield 24 and the upper portion of the instrument panel 18. At this time, there is a tendency for the lower portion of the occupant's body to be propelled forward and under the primary airbag 20 (hereinafter referred to as "submarining"). This tendency is pronounced when the occupant 12 is not restrained by a seat belt, or if the seat belt is not properly tensioned over the occupant's lap. To compensate for submarining, the knee airbag 22 deploys and expands into an inflated position to hold the knees and lower legs from sliding forward. This causes the lower portion of the occupant's body to resist submarining.

Figure 2:
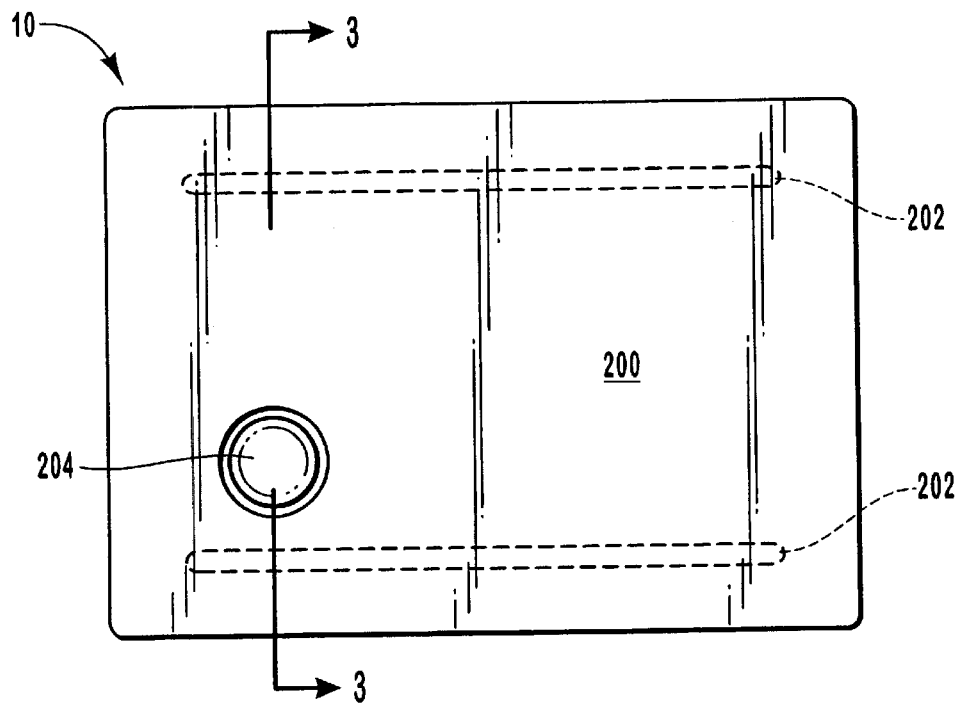
FIG. 2 is a plan view of one embodiment of the knee airbag system of the present invention.

Referring to FIG. 2, a plan view of one embodiment of a knee airbag system 10 of the present invention is shown. The system 10 may include a bolster panel 200 which is disposed on the exterior surface of the knee airbag 22 such that the knee airbag 22 is in front of the occupant's knees and lower legs. Upon deployment, the bolster panel 200 provides a rigid surface area to engage the occupant to thereby restrain submarining of the occupant's lower body.

The bolster panel 200 may be secured to the knee airbag 22 through use of adhesives, clips, stitches, and so forth. In one embodiment, the system 10, further includes one or more retention rods 202 that laterally traverse the bolster panel 200. The retention rods 202 are disposed adjacent retention apertures (not shown). The retention rods 202 are configured with diameters greater than the cross sectional area of a retention aperture. A portion of the knee airbag 22 extends through a retention aperture and around a retention rod 202. In this manner, the bolster panel 200 may be secured to the knee airbag 22.

The system 10 further includes a clearance tunnel 204 that is shown disposed within the bolster panel 200. The clearance tunnel 204 traverses the system 10 to provide localized clearance of a protruding member that extends through a region occupied by the system 10. The member may be any number of devices that may extend from the lower portion of an instrument panel and may include a handle, lever, knob, switch, or other instrument available for manual operation by an occupant. The member may also include devices to deliver air or sound to an occupant such as a vent or a speaker. The clearance aperture 204 may be configured in various ways to accommodate the protruding member. Thus, one of skill in the art will appreciate that the aperture 204 need not be circular, but may also be oval, rectangular, triangular, etc. as best suits the protruding member.

Figure 3:
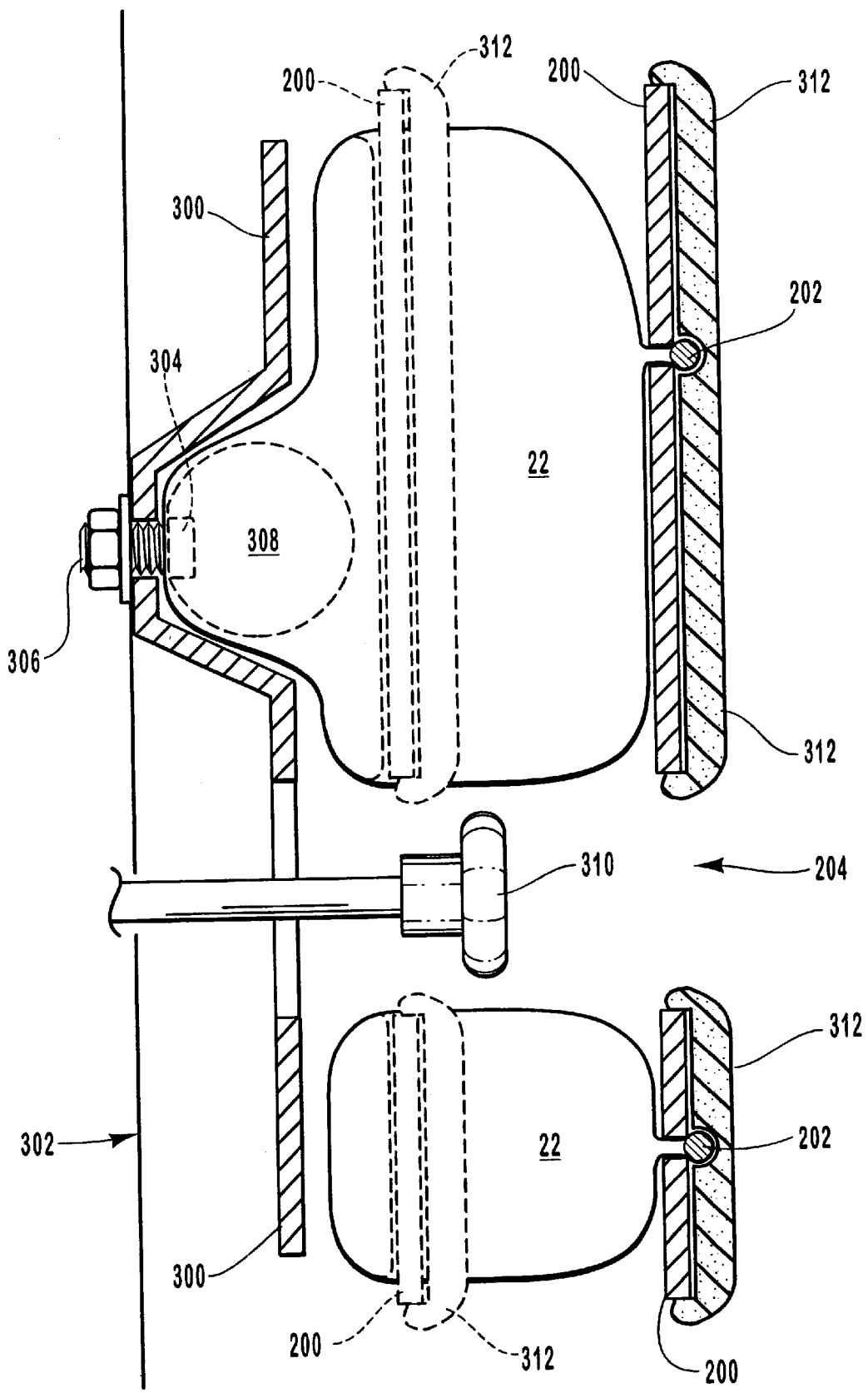
FIG. 3 is a cross sectional view of the knee airbag system of FIG. 2 taken across line 3—3.

Referring to FIG. 3, a cross sectional view of the system 10 is shown taken across line 3—3 of FIG. 2. The system 10 includes a housing 300 for containing elements of the system 10 such as the deflated knee airbag 22. The housing 300 may be secured to a wall 302, such as a firewall or the back wall of the instrument panel 18. The housing 300 further contains an initiator 304 that is in electrical communication through an input 306 with an electronic control unit (ECU) (not shown). When the initiator 304 receives an electronic signal from the ECU indicating an accident situation, the initiator 304 signals an inflator 308 to deploy the knee airbag 22. The knee airbag 22 and the bolster panel 200 are shown in both the inflated and deflated positions, the deflated positions being indicated by dotted lines.

The clearance tunnel 204 is formed through the housing 300, the knee airbag 22, and the bolster panel 200. As such, the housing 300, the knee airbag 22, and the bolster panel 200 are configured with apertures to form and define the clearance tunnel 204. The apertures are in-line with one another to provide unobstructed passage. The knee airbag 22 is secured along the perimeter of its aperture to allow inflation. The securement of the knee airbag 22 may be achieved through conventional methods such as heating, sewing, adhesives, and so forth.

Further illustrated in FIG. 3 is the protruding member 310 that extends through the clearance tunnel 204 and may be fixed to the wall 302. The protruding member 310 may extend through and exit the clearance tunnel 204 when the knee airbag 22 is in the deflated position. This allows an occupant to access the protruding member 310 that may be embodied as a lever, handle or a switch. Alternatively, the protruding member 310 may be flush with the deflated knee airbag 22 to accommodate a protruding member 310 that is embodied as a speaker or vent.

The clearance tunnel 204 is configured to not interfere with the deployment of the knee airbag 22 and bolster panel 200. Thus, there is sufficient space around the protruding member 310 to allow the knee airbag 22 and the bolster panel 200 to inflate and extend without hindrance. An inflated knee airbag 22 extends the depth of the clearance tunnel 204 and may block access to the protruding member 310. This occurs for a brief instant in time during an accident situation and is not significant.

The knee airbag system 10 may further include a panel member 312 that is secured to the exterior of the bolster panel 200 such that it is deployed in front of an occupant's knees and lower legs. The panel member 312 may be secured through the use of clips, screws, adhesives, or other types of fasteners. The panel member 312 is contoured to the exterior surface of the instrument panel 18 and provides an aesthetic appeal to the interior. The panel member 312 is further configured with an aperture to further define the clearance tunnel 204 and permit passage of the protruding member 310.

Figure 4:
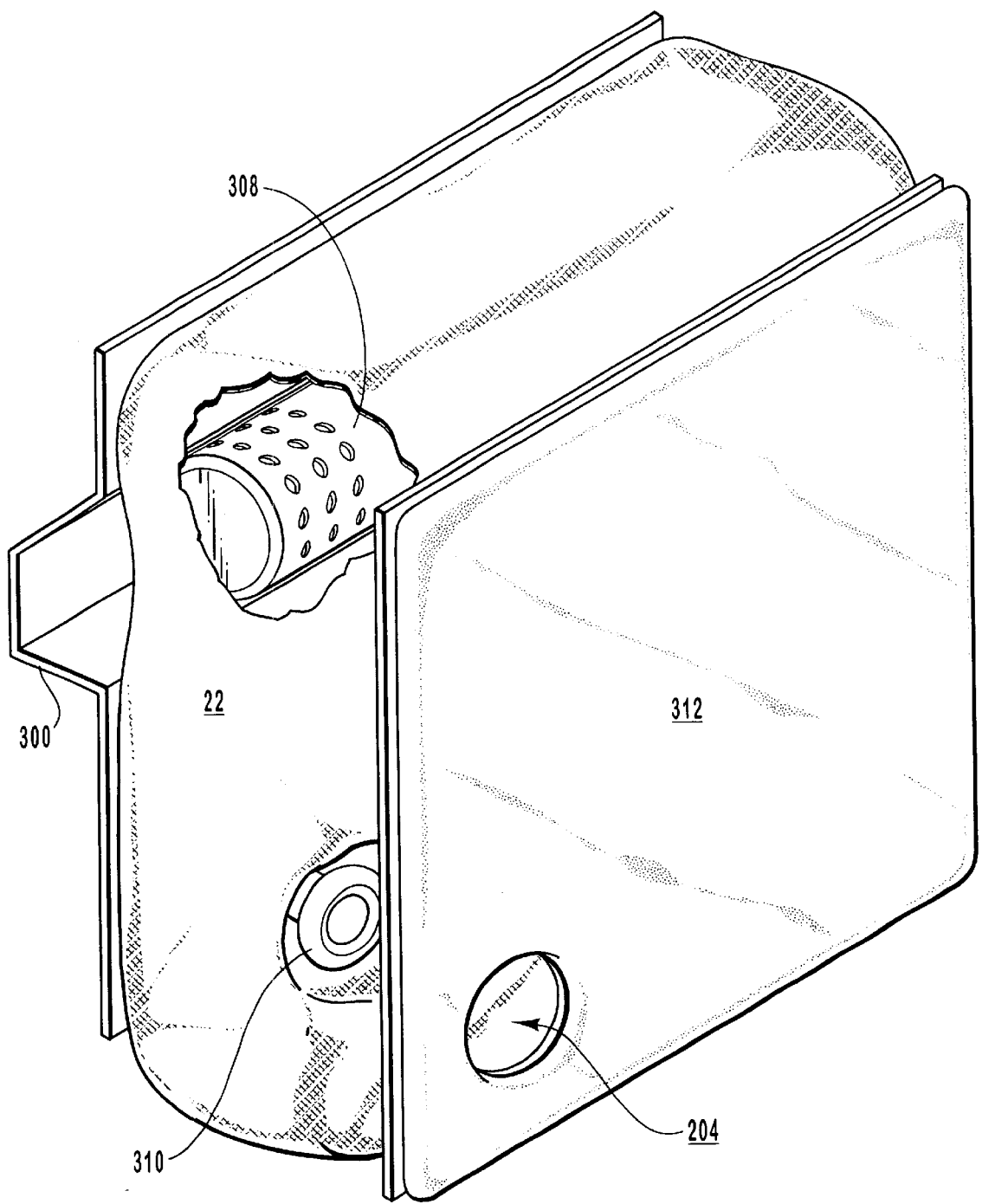
FIG. 4 is a perspective view of the knee airbag system of FIGS. 2 and 3.

Referring to FIG. 4, a perspective view of the knee airbag system 10 is shown. The panel member 312, clearance tunnel 204, and protruding member 310 are shown as they may be viewed installed within the instrument panel 18.

One of skill in the art will appreciate that the present invention is not limited to a single clearance tunnel 204. In alternative embodiments, a plurality of clearance tunnels 204 may be disposed within the knee airbag system 10 to accommodate protruding members 310. Each clearance tunnel would have corresponding, in-line apertures in the housing 300, airbag 22, bolster panel 200, and panel member 312 to allow for unobstructed passage.

The present invention accommodates instruments extending from an instrument panel in a region occupied by the knee airbag system 10. The invention allows access to the instrument while not obstructing inflation of the knee airbag 22. The knee airbag system 10 may be configured for retrofitting existing instrument panel designs and is economical to manufacture.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. An airbag system for restraining an occupant during inflation, comprising:
   an inflatable airbag having an airbag aperture that traverses the airbag in a lateral direction;
   an inflator in communication with the airbag; and
   a bolster panel secured to the airbag and disposed between the airbag and the occupant, the bolster panel having a bolster aperture in-line with the airbag aperture, the airbag aperture and bolster aperture defining a clearance tunnel.

2. The airbag system of claim 1, further comprising a panel member secured to the bolster panel and disposed between the bolster panel and an occupant, the panel member having a panel aperture in-line with the airbag aperture and the bolster aperture and further defining the clearance tunnel.

3. The airbag system of claim 1, wherein the clearance tunnel is circular.

4. The airbag system of claim 1, wherein the clearance tunnel is rectangular.

5. The airbag system of claim 1, further comprising a housing secured to an instrument panel and containing the inflator and the airbag, the housing having a housing aperture in-line with the airbag aperture and the bolster aperture and further defining the clearance tunnel.

6. The airbag system of claim 1, wherein the housing is secured to the instrument panel such that the inflated airbag system engages the lower portion of an occupant's body.

7. The airbag system of claim 1, further composing a retention rod secured to the airbag, the bolster panel disposed between the retention rod and the airbag to thereby secure the bolster panel to the airbag.

8. The airbag system of claim 1, wherein the airbag has a second airbag aperture and the bolster panel has a second bolster aperture in-line with the second airbag aperture, the second airbag aperture and the second bolster aperture defining a second clearance tunnel to allow passage of a member.

9. A knee airbag system disposed within an instrument panel for restraining the lower body of an occupant during inflation, comprising:
   a housing secured to the instrument panel and having a housing aperture;
   an inflatable airbag stored within the housing and having an airbag aperture that traverses the airbag in a lateral direction, the airbag aperture being in-line with the housing aperture, the inflatable airbag sealed around a perimeter of the airbag aperture to enable inflation of the airbag;
   an inflator stored within the housing and in communication with the airbag; and
   a bolster panel secured to the airbag and disposed between the airbag and an occupant, the bolster panel having a bolster aperture in-line with the airbag aperture and the housing aperture, the housing aperture, airbag aperture and bolster aperture defining a clearance tunnel.

10. The airbag system of claim 9, further comprising a panel member secured to the bolster panel and disposed between the bolster panel and an occupant, the panel member having a panel aperture in-line with the housing aperture, airbag aperture, and the bolster aperture and further defining the clearance tunnel.

11. The airbag system of claim 9, wherein the clearance tunnel is circular.

12. The airbag system of claim 9, wherein the clearance tunnel is rectangular.

13. The airbag system of claim 9, further comprising a retention rod secured to the airbag, the bolster panel disposed between the retention rod and the airbag to thereby secure the bolster panel to the airbag.

14. The airbag system of claim 9, wherein the housing has a second housing aperture, the airbag has a second airbag aperture, and the bolster panel has a second bolster aperture, the second housing aperture, the second airbag aperture, and the second bolster aperture disposed inline with one another and defining a second clearance tunnel to allow passage of a member.

15. The airbag system of claim 9, wherein the housing, airbag, and bolster panel are disposed such that a member may extend through and protrude from the clearance tunnel when the airbag is in a deflated state.

* * * * *